(12) United States Patent
Hessling-Von Heimendahl et al.

(10) Patent No.: US 11,274,811 B2
(45) Date of Patent: Mar. 15, 2022

(54) REPLACEABLE LIGHT HEAD FOR EXTERIOR AIRCRAFT LIGHT, AND METHOD OF EVALUATING AN OPERATING STATUS OF AN INTERNAL POWER SUPPLY OF AN EXTERIOR AIRCRAFT LIGHT

(71) Applicant: Goodrich Lighting Systems GmbH, Lippstadt (DE)

(72) Inventors: Andre Hessling-Von Heimendahl, Koblenz (DE); Matthias Krause, Hamm (DE); Robert Trinschek, Hamm (DE); Jens Leuschner, Moehnensee (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/951,268

(22) Filed: Nov. 18, 2020

(65) Prior Publication Data
US 2021/0156545 A1 May 27, 2021

(30) Foreign Application Priority Data

Nov. 21, 2019 (EP) ..................................... 19210630

(51) Int. Cl.
*F21V 17/00* (2006.01)
*F21S 43/14* (2018.01)
(Continued)

(52) U.S. Cl.
CPC ............ *F21V 17/002* (2013.01); *B64D 41/00* (2013.01); *B64D 47/04* (2013.01); *B64D 47/06* (2013.01);
(Continued)

(58) Field of Classification Search
CPC ................................ B64D 47/04; B64D 47/06
See application file for complete search history.

(56) References Cited

U.S. PATENT DOCUMENTS 7,315,437 B2 1/2008 Bonilla et al.
8,471,731 B2 6/2013 Lundberg et al.
(Continued)

FOREIGN PATENT DOCUMENTS

| CN | 106707071 A | 5/2017 |
|---|---|---|
| EP | 3073249 A1 | 9/2016 |
| EP | 3297404 A1 | 3/2018 |

OTHER PUBLICATIONS

Abstract of CN106707071A.
Extended European Search Report for International Application No. 19210630.0 dated May 4, 2020, 7 pages.

*Primary Examiner* — Jong-Suk (James) Lee
*Assistant Examiner* — Eric T Eide
(74) *Attorney, Agent, or Firm* — Cantor Colburn LLP

(57) ABSTRACT

A replaceable light head for an exterior aircraft light includes a mounting structure for attaching the replaceable light head to the exterior aircraft light; a power terminal, coupleable to an internal power supply of the exterior aircraft light; at least one light source, coupled to the power terminal for receiving power from the internal power supply of the exterior aircraft light; a data interface, coupleable to a controller of the exterior aircraft light; and a memory, coupled to the data interface and configured to receive and store usage data of the internal power supply of the exterior aircraft light.

13 Claims, 6 Drawing Sheets

(51) Int. Cl.
  *B64D 41/00*    (2006.01)
  *B64D 47/04*    (2006.01)
  *B64D 47/06*    (2006.01)
  *F21V 19/00*    (2006.01)
  *F21V 23/00*    (2015.01)
  *F21V 23/06*    (2006.01)
  *F21Y 115/10*   (2016.01)

(52) U.S. Cl.
  CPC .......... *F21S 43/14* (2018.01); *F21V 19/0015* (2013.01); *F21V 23/003* (2013.01); *F21V 23/06* (2013.01); *F21Y 2115/10* (2016.08)

(56) References Cited

U.S. PATENT DOCUMENTS

| | | |
|---|---|---|
| 8,840,070 B2 | 9/2014 | Boucaud et al. |
| 2007/0285267 A1 | 12/2007 | Wang |
| 2016/0282283 A1* | 9/2016 | Hessling-Von Heimendahl ......... B64D 45/00 |
| 2017/0073083 A1* | 3/2017 | Hessling-von Heimendahl .......... B64D 47/04 |
| 2017/0233101 A1* | 8/2017 | Hessling-Von Heimendahl ......... H05B 47/24 362/470 |
| 2018/0084620 A1* | 3/2018 | Klein ................ H05B 45/14 |

\* cited by examiner

REPLACEABLE LIGHT HEAD FOR EXTERIOR AIRCRAFT LIGHT, AND METHOD OF EVALUATING AN OPERATING STATUS OF AN INTERNAL POWER SUPPLY OF AN EXTERIOR AIRCRAFT LIGHT

FOREIGN PRIORITY

This application claims priority to European Patent Application No. 19210630.0 filed Nov. 21, 2019, the entire contents of which is incorporated herein by reference.

TECHNICAL FIELD

The present invention is in the field of exterior aircraft lighting. In particular, the present invention relates to exterior aircraft lights having a modular structure.

BACKGROUND

Almost all aircraft are equipped with exterior lighting systems. For example, large commercial aircraft have many different exterior aircraft lights. An exemplary group of exterior aircraft lights are lights for passive visibility and signalling, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another exemplary group of exterior aircraft lights are scan lights that allow the inspection of the aircraft structure in the dark, such as wing scan lights. A sudden failure of an exterior aircraft light may have severe safety implications. As a consequence, an aircraft may have to be kept on the ground, until a broken exterior aircraft light is repaired or replaced.

Accordingly, it would be beneficial to provide exterior aircraft light components and exterior aircraft lights that allow for an improved reliability of the aircraft lighting system.

SUMMARY

Exemplary embodiments of the invention include a replaceable light head for an exterior aircraft light, comprising: a mounting structure for attaching the replaceable light head to the exterior aircraft light; a power terminal, coupleable to an internal power supply of the exterior aircraft light; at least one light source, coupled to the power terminal for receiving power from the internal power supply of the exterior aircraft light; a data interface, coupleable to a controller of the exterior aircraft light; and a memory, coupled to the data interface and configured to receive and store usage data of the internal power supply of the exterior aircraft light.

Exemplary embodiments of the invention allow for an effective monitoring of the operation of the internal power supply of an exterior aircraft light and may, thus, allow for a timely replacement of the internal power supply and/or associated components, before a sudden failure occurs. The replaceable light head is an effective carrier for information about the operation of the internal power supply. In many exterior aircraft lights, the replaceable light head has a much shorter life cycle than the exterior aircraft light as a whole and than the internal power supply. When removing the replaceable light head from the exterior aircraft light, the usage data of the internal power supply may be conveniently read out and may be analysed for evaluating an operating status of the internal power supply. An informed decision with respect to the internal power supply can be made for the next scheduled maintenance interval and/or for an extraordinary maintenance. The shorter life cycle of the at least one light source, as compared to the circuit components of the internal power supply, can be made use of by using the replacement of the light head for communicating information about the internal power supply to an entity outside of the exterior aircraft light.

The replaceable light head has a power terminal that is coupleable to an internal power supply of the exterior aircraft light. In other words, upon installing the replaceable light head in the exterior aircraft light, the power terminal may be coupled to the internal power supply of the exterior aircraft light. When removing the replaceable light head from the exterior aircraft light, the power terminal may be de-coupled from the internal power supply of the exterior aircraft light. When coupling the power terminal to the internal power supply, an electric connection between the internal power supply and the power terminal and, thus, an electric connection between the internal power supply and the at least one light source of the replaceable light head can be established.

The replaceable light head has a data interface, coupleable to the controller of the exterior aircraft light. When installing the replaceable light head in the exterior aircraft light, the data interface may be coupled to the controller of the exterior aircraft light. When removing the replaceable light head from the exterior aircraft light, the data interface may be de-coupled from the controller of the exterior aircraft light. When installing the replaceable light head in the exterior aircraft light, a data channel between the controller of the exterior aircraft light and the data interface and, thus, between the controller of the exterior aircraft light and the memory of the replaceable light head may be established.

The replaceable light head has a power terminal coupleable to an internal power supply of the exterior aircraft light and a data interface coupleable to a controller of the exterior aircraft light. In this way, the replaceable light head has a power and data interface, which allows reception of power for operating the at least one light source on the one hand and allows for reception of usage data of the internal power supply of the exterior aircraft light for storage in the memory on the other hand.

The replaceable light head has at least one light source. The at least one light source may be at least one LED. With LEDs being reliable, compact, and power efficient light sources, a compact, reliable and efficient implementation of the replaceable light head may be achieved.

The replaceable light head has a memory that is configured to receive and store usage data of the internal power supply of the exterior aircraft light. The memory is able to store data and to maintain said data in the memory. In particular, the memory is able to maintain the data in the absence of electrical power. The memory may be configured to store the usage data of the internal power supply of the exterior aircraft light in a dedicated memory portion and/or in accordance with a suitable data storage protocol. The memory may for example be an EEPROM or a flash memory or any other suitable type of memory that allows for reliably storing the usage data of the internal power supply in the demanding environment of an exterior aircraft light. The memory may in particular be suitable for maintaining the usage data after removing the replaceable light head from the exterior aircraft light.

The replaceable light head has a power terminal coupleable to the internal power supply of the exterior aircraft light. The term internal power supply refers to an entity within the exterior aircraft light that is configured to provide the required energy for generating the light output of the exterior aircraft light. The exterior aircraft light in turn may be coupled to an aircraft on-board power supply network. When the replaceable light head is installed in the exterior aircraft light, power form the aircraft on-board power supply network may be received at the exterior aircraft light and may be provided to the replaceable light head via the internal power supply. The internal power supply may therefore also be seen as a power conditioning circuit, receiving power from the aircraft on-board power supply network and providing power, suitable for operating the at least one light source in a desired manner.

According to a further embodiment, the usage data of the internal power supply of the exterior aircraft light comprises at least one of operating time of the internal power supply and operating temperature of the internal power supply. In this way, the number of operating hours and/or the temperature during operation of the internal power supply can be logged in the memory of the replaceable light head. The combination of operating time and operating temperature may be evaluated as a good indicator for the strain exerted onto the internal power supply. For example, extended operations of the internal power supply in very hot conditions, such as on an airport in the desert or a desert-like region, may be recorded and may be taken into account when evaluating the residual life time of the internal power supply. The operating temperature may be an ambient temperature within the exterior aircraft light. It is also possible that the operating temperature is the operating temperature within one or more circuit components of the exterior aircraft light, in particular within one or more circuit components of the internal power supply of the exterior aircraft light. Both the ambient temperature and the operating temperature of a circuit component may be valid indicators for the temperature strain exerted onto the internal power supply.

According to a further embodiment, the replaceable light head further comprises a light sensor, arranged to monitor the at least one light source, wherein the light sensor is coupled to the memory and wherein the memory is configured to store light sensor data, output by the light sensor. In this way, the replaceable light head may not only act as a carrier for the usage data of the internal power supply of the exterior aircraft light, but also as a carrier for information about the performance of the at least one light source. In this way, when replacing the light head of the exterior aircraft light, it may be determined whether the at least one light source degraded in an expected manner or whether abnormalities in the performance of the at least one light source occurred. Such abnormalities may be an indicator for a malfunction of the internal power supply of the exterior aircraft light and/or may help in adapting the next light head to the particular exterior aircraft light in question.

According to a further embodiment, the replaceable light head further comprises a temperature sensor, arranged to monitor an operating temperature of the replaceable light head, wherein the temperature sensor is coupled to the memory and wherein the memory is configured to store temperature sensor data, output by the temperature sensor. In this way, additional context with respect to the operation of the replaceable light head may be stored in the memory and may be available for analysis, after the replaceable light head has been removed from the exterior aircraft light. The temperature sensor data may for example explain an unexpectedly quick degradation of the performance of the at least one light source. As a further example, the temperature sensor data of the temperature sensor of the replaceable light head may be related to the operating temperature of the internal power supply, in order to potentially detect abnormal temperature gradients between the internal power supply and the replaceable light head and to explain operating faults therefrom.

According to a further embodiment, the replaceable light head further comprises at least one of a position sensor, a velocity sensor, and an acceleration sensor, configured to issue a trigger signal, indicative of an aircraft take-off, to the memory. In this way, the memory may store usage data of the internal power supply and/or light sensor data and/or temperature sensor data in conjunction with an indication whether or not the aircraft is on the ground. The mentioned sensors may be configured to issue the trigger signal on the basis of the raw sensor data or may be configured to issue the trigger signal on the basis of some post-processing of the sensor data. For example, the velocity sensor may issue the trigger signal in case a velocity of more than 250 km/h is reached. The position sensor may deduce the reaching of such a velocity threshold by evaluating the gradient of the position. In another example, the acceleration sensor may issue the trigger signal in case a typical take-off acceleration pattern is detected, such as an acceleration in excess of a predefined acceleration threshold value for more than 20 s.

According to a further embodiment, the memory is configured to store usage data of the internal power supply after receipt of the trigger signal. In a particular embodiment, the memory may be configured to store usage data of the internal power supply continuously after the first receipt of the trigger signal. In this way, the memory may distinguish between a functional test of the replaceable light head on the ground and the intended operation of the replaceable light head within an exterior aircraft light. It can thus be ensured that usage data will only be stored, after the replaceable light head is installed in the exterior aircraft light and actually used during operation of the aircraft. Time periods, in which the replaceable light head is waiting for its operation in the exterior aircraft light and which may distort the analysis of the usage of the internal power supply, may thus be eliminated. It is also possible that the memory is configured to wait for the trigger signal after each power-up operation, before starting to store usage data of the internal power supply. In this way, each take-off will start a new data storage cycle. The memory may further be configured to store light sensor data and/or temperature sensor data after receipt of the trigger signal.

According to a further embodiment, the memory is configured to store erosion data indicative of a state of erosion of a lens cover of the exterior aircraft light. In this way, the replaceable light head may additionally be used as a carrier for information about the state of the lens cover of the exterior aircraft light, such that a targeted replacement of the lens cover may be carried out. Also, the erosion data may help in determining whether the exterior aircraft was subject to abnormal impacts, particularly adverse operating conditions, etc. The state of erosion may be determined by detecting light diffusely reflected by the lens cover. This may be done via above discussed light sensor, e.g. in response to a predefined lens cover illumination pattern, or via another light sensor, dedicated to detecting diffusely reflected light from the lens cover.

According to a further embodiment, the exterior aircraft light, to which the replaceable light head may be mounted, is a multi-function exterior aircraft light, having at least two light heads, and the memory of the replaceable light head is configured to store data copied from another light head. In other words, the replaceable light head may be installed in an operating environment, where two or more light heads are arranged in the exterior aircraft light. In addition to being configured to store usage data of the internal power supply of the exterior aircraft light, the memory of the replaceable light head may be configured to store data copied from one or more of the other light head(s) present in the exterior aircraft light. In the particular example of the exterior aircraft light having two light heads, such as a navigation light head and an anti-collision light head, each one of the two light heads may be a replaceable light head as described herein. Further, one or both of these light heads may have a memory that is configured to store data copied from the respectively other light head. The data copied from another light head may be usage data of the internal power supply and/or data regarding the other light head, such as light sensor data and/or temperature sensor data of the other light head, and/or erosion data regarding the lens cover of the exterior aircraft light. By storing copied data, redundancy between the multiple light heads may be achieved. In case the data on one of the memories is corrupted, the other memory may still be used to convey usage data of the internal power supply and potentially other data, when removed from the exterior aircraft light. Data mirroring may take place between the memories of the multiple light heads.

According to a further embodiment, the mounting structure comprises a circuit board, with the at least one light source and the memory being mounted to the circuit board. The circuit board may in particular be a printed circuit board. In this way, the mounting structure integrates the functions of mechanically attaching the replaceable light head to the exterior aircraft light and providing the electric connections to the electric components of the replaceable light head.

According to a further embodiment, the replaceable light head further comprises an optical system arranged over the at least one light source and mounted to the mounting structure. The optical system may comprise one or more lenses and/or one or more shutters and/or one or more reflectors. The terminology of the optical system being arranged over the at least one light source is not meant to imply a particular orientation of the optical system in the replaceable light head. Rather, the optical system is meant to be arranged in such a way with respect to the at least one light source that it transforms the light output of the at least one light source into a desired light output of the exterior aircraft light. The at least one light source and the optical system can therefore be said to jointly provide a light put of the exterior aircraft light. In case the mounting structure comprises a circuit board, the optical system may be attached to the circuit board, in particular arranged over the at least one light source and attached to the circuit board in one or more mounting spots around the at least one light source.

According to a further embodiment, the replaceable light head is configured to provide at least one of a navigation light output, a white strobe anti-collision light output, and a red flashing beacon light output. In particular, the replaceable light head may be configured to provide a navigation light output that satisfies legal requirements and/or design parameters of the navigation lighting system for at least a part of the space around the aircraft. Additionally/alternatively, the replaceable light head may be configured to provide a white strobe anti-collision light output that satisfies legal requirements and/or design parameters of the white strobe anti-collision lighting system for at least a part of the space around the aircraft. Alternatively/additionally, the replaceable light head may be configured to provide a red flashing beacon light output that satisfies legal requirements and/or design parameters of the beacon lighting system for at least part of the space around the aircraft. Exemplary legal requirements for navigation lights are given in Federal Aviation Regulations (FAR) sections 25.1385, 25.1387, 25.1389, 25.1391, 25.1393, 25.1395, and 25.1397. Exemplary legal requirements for white strobe anti-collision lights and red flashing beacon lights are given in Federal Aviation Regulations (FAR) section 25.1401. It is pointed out that the functions of navigation lighting, white strobe anti-collision lighting, and red flashing beacon lighting may be combined in a single replaceable light head or may be distributed among different replaceable light heads of one exterior aircraft light or may be distributed among replaceable light heads of different exterior aircraft lights.

Exemplary embodiments of the invention further include an exterior aircraft light, comprising: a power input, coupleable to an aircraft on-board power supply network; an internal power supply, coupled to the power input; a controller; and a replaceable light head, as described in any of the embodiments above; wherein the power supply terminal of the replaceable light head is coupled to the internal power supply and wherein the data interface of the replaceable light head is coupled to the controller. The additional features, modifications, and effects, described above with respect to the replaceable light head, apply to the exterior aircraft light in an analogous manner. The controller is coupled to the internal power supply and is configured to effect/control the power transfer from the power input to the at least one light source via the internal power supply. In this way, the controller is inherently aware of the operating times of the internal power supply and may convey said information to the memory via the data interface of the replaceable light head.

According to a further embodiment, the exterior aircraft light has a power supply temperature sensor, coupled to the controller. The controller may convey power supply temperature sensor data to the memory of the replaceable light head via the data interface.

According to a further embodiment, the exterior aircraft light is one of a navigation light, a white strobe anti-collision light, a red flashing beacon light, and a headlight. The term headlight may include any of a landing light, a take-off light, a runway turn-off light, and a taxi light. The exterior aircraft light may also be a multipurpose exterior aircraft light, combining two or more of said lighting functions. For example, the exterior aircraft light may be a combined aircraft navigation and white strobe anti-collision light. In case of such multi-purpose exterior aircraft lights, the different lighting functions may be distributed among different replaceable light heads or may be combined in a single replaceable light head. For example, a combined aircraft navigation and anti-collision light may have a first replaceable light head for the navigation lighting functionality and a second replaceable light head for the white strobe anti-collision lighting functionality.

Exemplary embodiments of the invention further include an aircraft comprising at least one exterior aircraft light, as described in any of the embodiments above. The additional features, modifications, and effects, described above with respect to the replaceable light head and with respect to the exterior aircraft light, apply to the aircraft in an analogous manner. The aircraft may in particular be an air plane, such as a commercial passenger air plane.

Exemplary embodiments of the invention further include a method of evaluating an operating status of an internal power supply of an exterior aircraft light, comprising: during operation of the exterior aircraft light, storing usage data of the internal power supply of the exterior aircraft light in a memory of a replaceable light head of the exterior aircraft light; removing the replaceable light head from the exterior aircraft light; and reading the usage data out of the memory and evaluating the operating status of the internal power supply of the exterior aircraft light from the usage data. The additional features, modifications, and effects, as described above with respect to the replaceable light head and with respect to the exterior aircraft light, apply to the method of evaluating the operating status of the internal power supply of the exterior aircraft light in an analogous manner.

The removing of the replaceable light head may take place at a regular maintenance interval or pursuant to the detection of a near end of life condition of the at least one light source or pursuant to the detection of any other condition requiring maintenance.

The reading out of the usage data may take place in a convenient working space separate from the aircraft, such as in a factory, a laboratory or similar setting. It is also possible that a diagnosis tool may be coupled to the memory of the replaceable light head for reading out the usage data, when the replaceable light head is still fully or partially installed in the exterior aircraft light. It is further possible that an initial evaluation of the operating status takes place via such diagnosis tool, while a full evaluation of the usage data takes place in a setting separate from the aircraft.

According to a further embodiment the method further comprises detecting an aircraft take-off; and starting the storing of usage data of the internal power supply of the exterior aircraft light in response to an aircraft take-off being detected. The storing of usage data may continue as long as the replaceable light head is installed in the exterior aircraft light, after a first aircraft take-off is detected. It is also possible that the storing of usage data is stopped, when the exterior aircraft light is powered down, such as when the aircraft is put to an overnight parking position. In that case, the storing of usage data may be re-started at the next aircraft take-off.

BRIEF DESCRIPTION OF THE DRAWINGS

Further exemplary embodiments of the invention will be described below with respect to the accompanying drawings, wherein.

DETAILED DESCRIPTION

Figure 1:
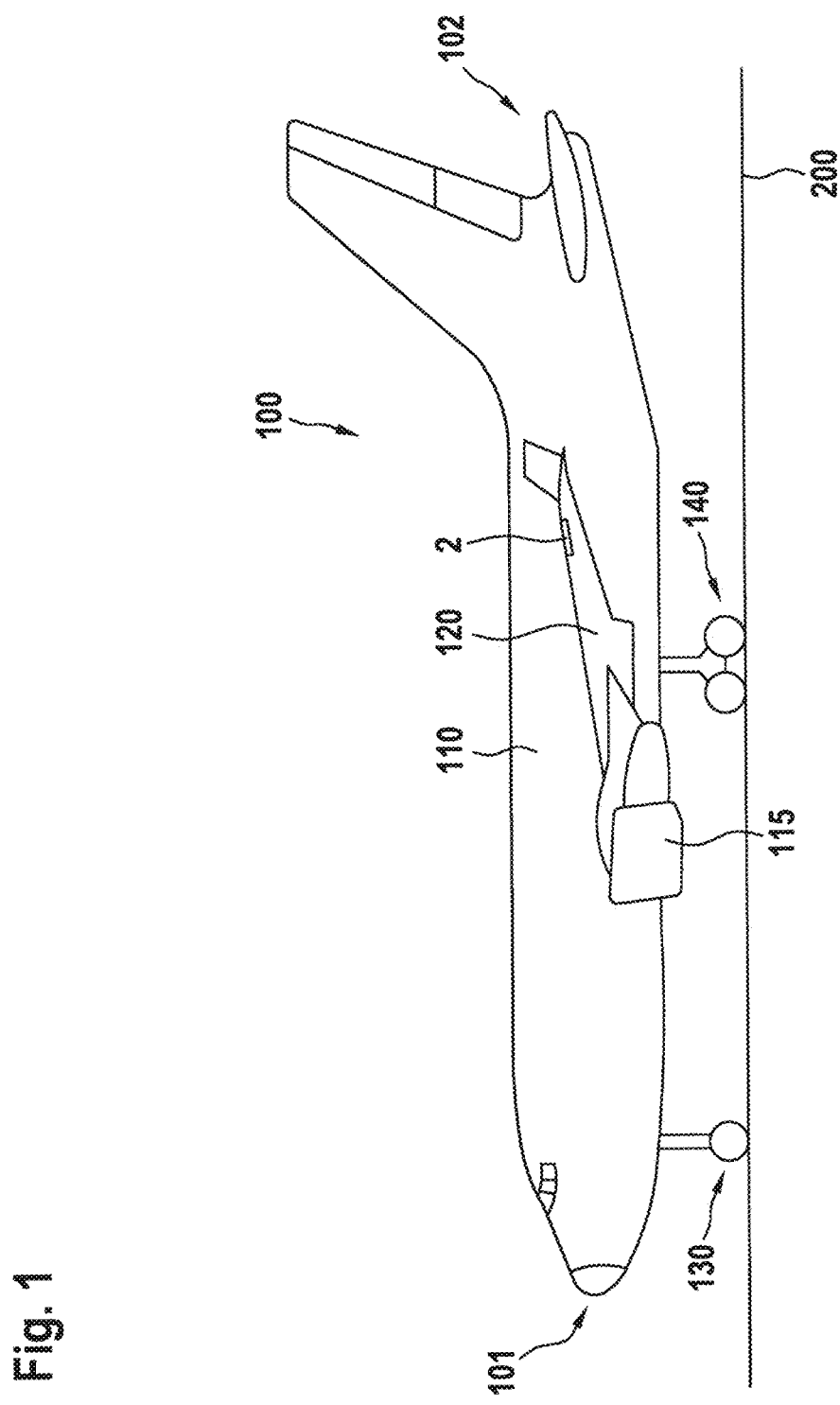
FIG. 1 shows a schematic side view of an aircraft in accordance with an exemplary embodiment of the invention, the aircraft being equipped with combined aircraft navigation and anti-collision lights in accordance with exemplary embodiments of the invention.
Figure 2:
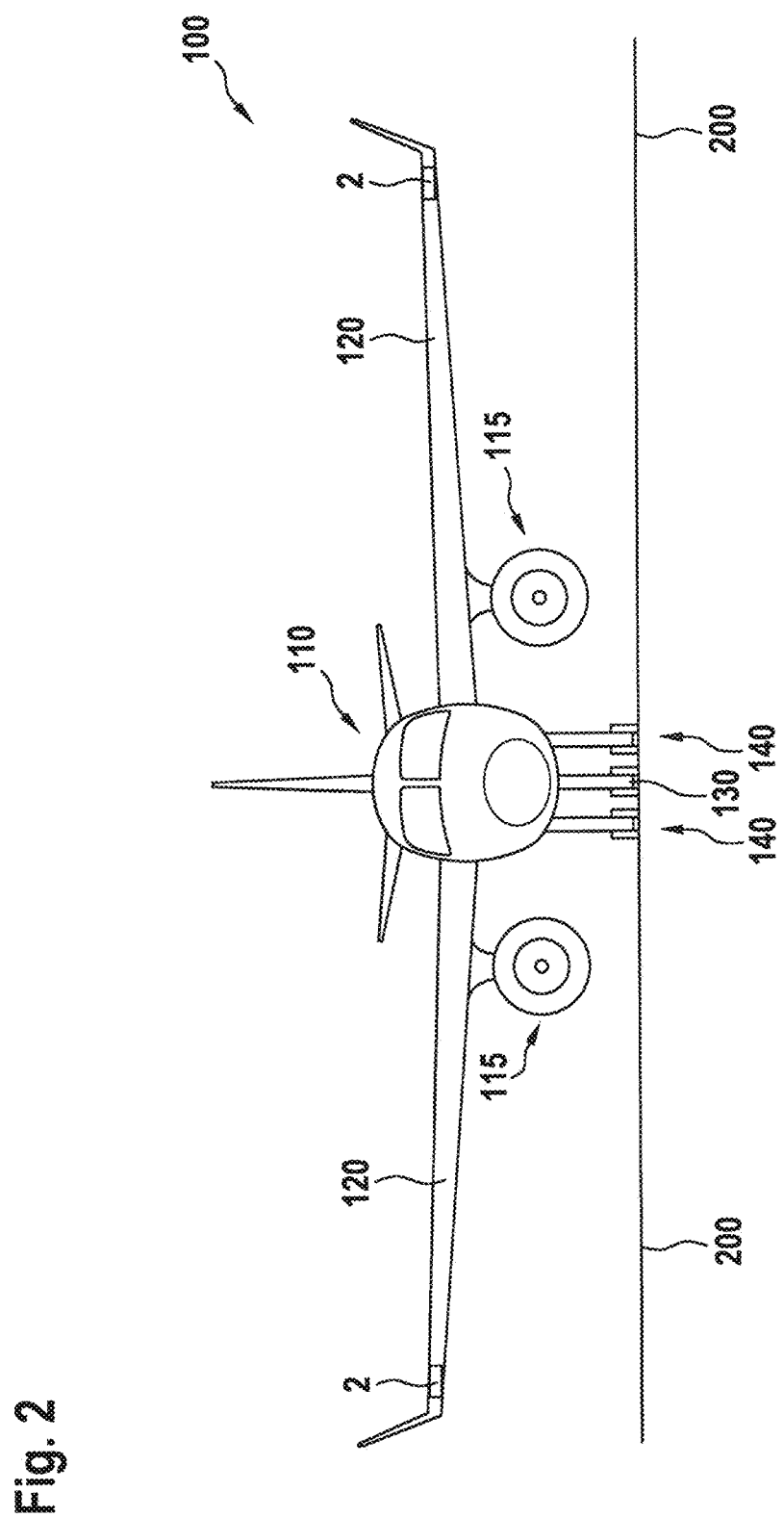
FIG. 2 shows a schematic front view of the aircraft depicted in FIG. 1.

FIG. 1 shows a schematic side view of an aircraft 100 in accordance with an exemplary embodiment of the invention. In the exemplary embodiment of FIG. 1, the aircraft is a large commercial passenger air plane. FIG. 2 shows a schematic front view of the aircraft 100, depicted in FIG. 1.

The aircraft 100, depicted in FIGS. 1 and 2, is resting on a ground 200, such as a runway, a taxi way, an airport ramp, or a ground portion next to a gate. The aircraft 100 has a fuselage 110, extending from a tip 101 of the aircraft to a tail 102 of the aircraft, two wings 120, extending laterally from the fuselage 110, a front gear 130 and two main gears 140. Each of the left and right wings 120 supports an engine 115. Only the left one of the wings 120, the engines 115 and the main gears 140 is visible in the side view of FIG. 1.

The aircraft 100 is equipped with two forward combined aircraft navigation and anti-collision lights 2. In particular, the aircraft 100 has a left combined aircraft navigation and anti-collision light 2, arranged in a wing tip region of the left wing 120 of the aircraft 100, and a right combined aircraft navigation and anti-collision light 2, arranged in a wing tip region of the right wing 120 of the aircraft 100. In the exemplary embodiment of FIGS. 1 and 2, each of the left and right combined aircraft navigation and anti-collision lights 2 is embodied in accordance with an exemplary embodiment of the invention. In particular, each of the left and right combined aircraft navigation and anti-collision lights 2 is equipped with two replaceable light heads in accordance with exemplary embodiments of the invention. It is understood that the aircraft 100 has various other exterior aircraft lights and that some or all of those other exterior aircraft lights may also be embodied in accordance with exemplary embodiments of the invention, in particular may be equipped with one or more replaceable light heads in accordance with exemplary embodiments of the invention. FIGS. 1 and 2 focus on the left and right combined aircraft navigation and anti-collision lights 2 for illustrative purposes.

Figure 3:
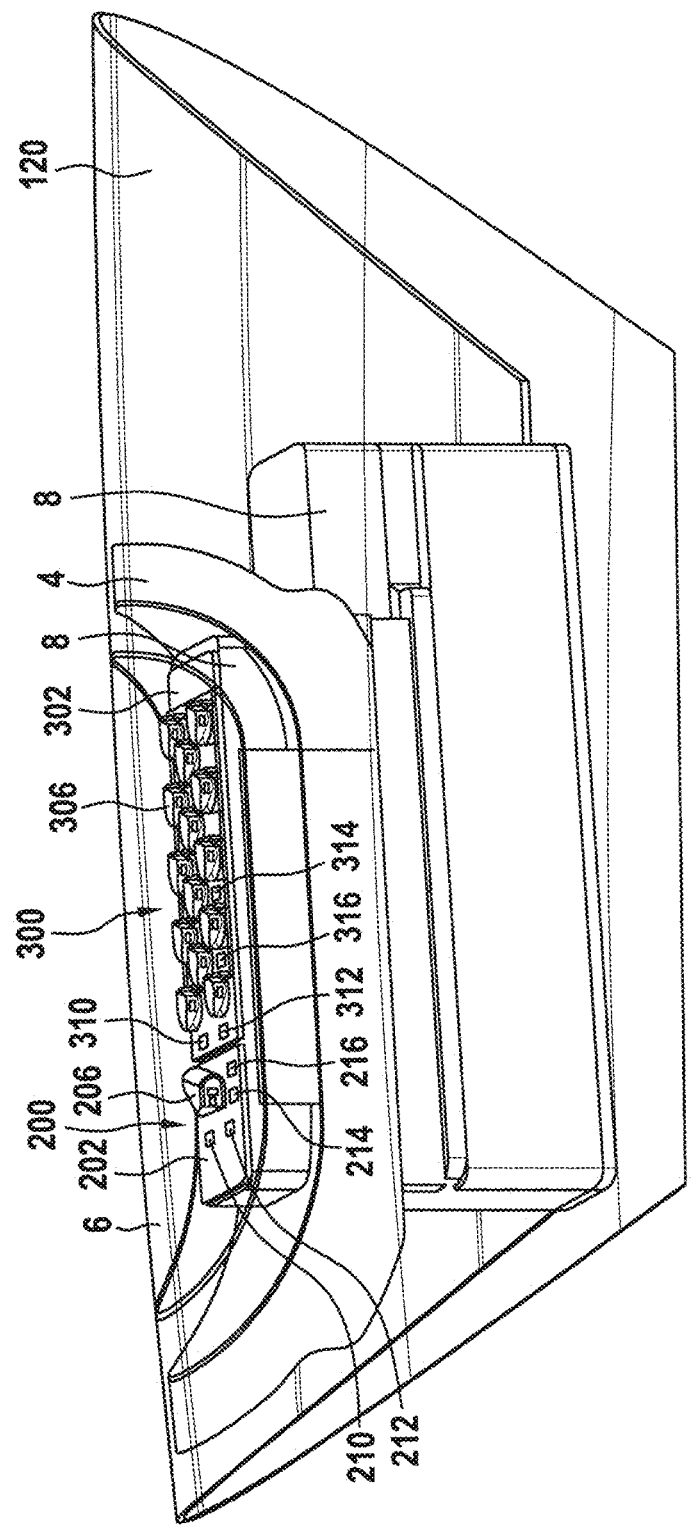
FIG. 3 shows a schematic perspective view of a portion of a left wing tip region of an aircraft, with a combined aircraft navigation and anti-collision light in accordance with an exemplary embodiment of the invention being installed in the depicted left wing tip region, the combined aircraft navigation and anti-collision light being equipped with two replaceable light heads in accordance with exemplary embodiments of the invention.

FIG. 3 shows a schematic perspective top view of a portion of the wing tip region of the left wing 120 of an aircraft in accordance with an exemplary embodiment of the invention. The front edge of the wing 120 is depicted towards the top in the drawing plane of FIG. 3. The depicted portion of the left wing 120 is towards the inside of the upwards bent wing tip, i.e. in the more or less horizontal part of the left wing 120. The portion of the left wing 120, depicted in FIG. 3, may be a portion of the left wing 120 of the aircraft 100, depicted in FIGS. 1 and 2.

A combined aircraft navigation and anti-collision light 2 in accordance with an exemplary embodiment of the invention is installed in the depicted portion of the wing 120. In the exemplary embodiment of FIG. 3, the combined aircraft navigation and anti-collision light 2 is a combined aircraft navigation and white strobe anti-collision light. Instead of/in addition to the white strobe anti-collision lighting functionality, the combined aircraft navigation and anti-collision light may also have red flashing beacon anti-collision lighting functionality.

The combined aircraft navigation and anti-collision light 2 is an example of an exterior aircraft light in accordance with an exemplary embodiment of the invention. As will be laid out below, the combined aircraft navigation and anti-collision light 2 of FIG. 3 has two replaceable light heads. In the exemplary embodiment of FIG. 3, each of those two light heads is embodied in accordance with an exemplary embodiment of the invention.

The combined aircraft navigation and anti-collision light 2 has a housing 4, which is arranged to the inside of the skin of the wing 120, and a lens cover 6 for closing the combined aircraft navigation and anti-collision light 2 with respect to the environment of the aircraft. The combined aircraft navigation and anti-collision light 2 further comprises a console 8, which is partly arranged between the housing 4 and the lens cover 6 and which partly extends through the housing 6 into the wing 120. The console 8 houses power and control circuitry for the navigation and anti-collision lighting functions. Examples of such power and control circuitry will be described below with respect to FIGS. 4 and 5.

The combined aircraft navigation and anti-collision light 2 further comprises a first replaceable light head 200 and a second replaceable light head 300. The first replaceable light head 200 is part of the navigation lighting functionality. The second replaceable light head 300 is part of the anti-collision lighting functionality.

The first replaceable light head 200 comprises a navigation light circuit board 202, to which at least one navigation light source is mounted. A navigation light optical system 206, which is a combination of a lens and a shutter in the exemplary embodiment of FIG. 3, is supported by the navigation light circuit board 202 and arranged over the at least one navigation light source for shaping the navigation light output. The first replaceable light head 200 further comprises a memory 210, a GPS sensor 212, a temperature sensor 214, and a light sensor 216, which are mounted to the navigation light circuit board 202. The temperature sensor 214 and the light sensor 216 are arranged close to or integrated with the at least one navigation light source and the navigation optical system 206, in order to monitor an operating temperature and a light output of the at least one light source. The memory 210 and the GPS sensor 212 may be arranged at any convenient location of the navigation light circuit board 202. The navigation light circuit board 202 is removably/detachably mounted to the console 8. It forms the mounting structure of the first replaceable light head 200. The operation of the first replaceable light head 200 will be described below with respect to FIG. 4.

The second replaceable light head 300 comprises an anti-collision light circuit board 302, to which fourteen combinations of an anti-collision light source and an associated second optical sub-system 306 for shaping the anti-collision light output are mounted. The fourteen anti-collision light sources jointly provide a high intensity flashing white anti-collision light output in the exemplary embodiment of FIG. 3. Each of the fourteen second optical sub-systems 306 is a combination of a lens and a shutter element in the exemplary embodiment of FIG. 3. The fourteen second optical subsystems 306 jointly form a second optical system, which transforms the light output by the anti-collision light sources into a suitable anti-collision light output.

The second replaceable light head 300 further comprises a memory 310, a GPS sensor 312, a temperature sensor 314, and a light sensor 316, which are mounted to the anti-collision light circuit board 202. The temperature sensor 314 and the light sensor 316 are arranged close to or integrated with one or more of said fourteen combinations of an anti-collision light source and an associated second optical subsystem 306, in order to monitor an operating temperature and a light output of at least one of the fourteen anti-collision light sources. The memory 310 and the GPS sensor 312 may be arranged at any convenient location of the anti-collision light circuit board 302. The anti-collision light circuit board 302 is removably/detachably mounted to the console 8. It forms the mounting structure of the second replaceable light head 300. The operation of the second replaceable light head 300 will be described below with respect to FIG. 5.

The first replaceable light head 200 and the second replaceable light head 300 are arranged between the console 8 and the lens cover 6, i.e. within the space between the housing 4 and the lens cover 6. They are further arranged to emit the navigation light output and the anti-collision light output through the lens cover 6. The first replaceable light head 200 and the second replaceable light head 300 can be removed from the combined aircraft navigation and anti-collision light 2, e.g. when reaching their end of life, and may be replaced with new replaceable light heads.

Figure 4:
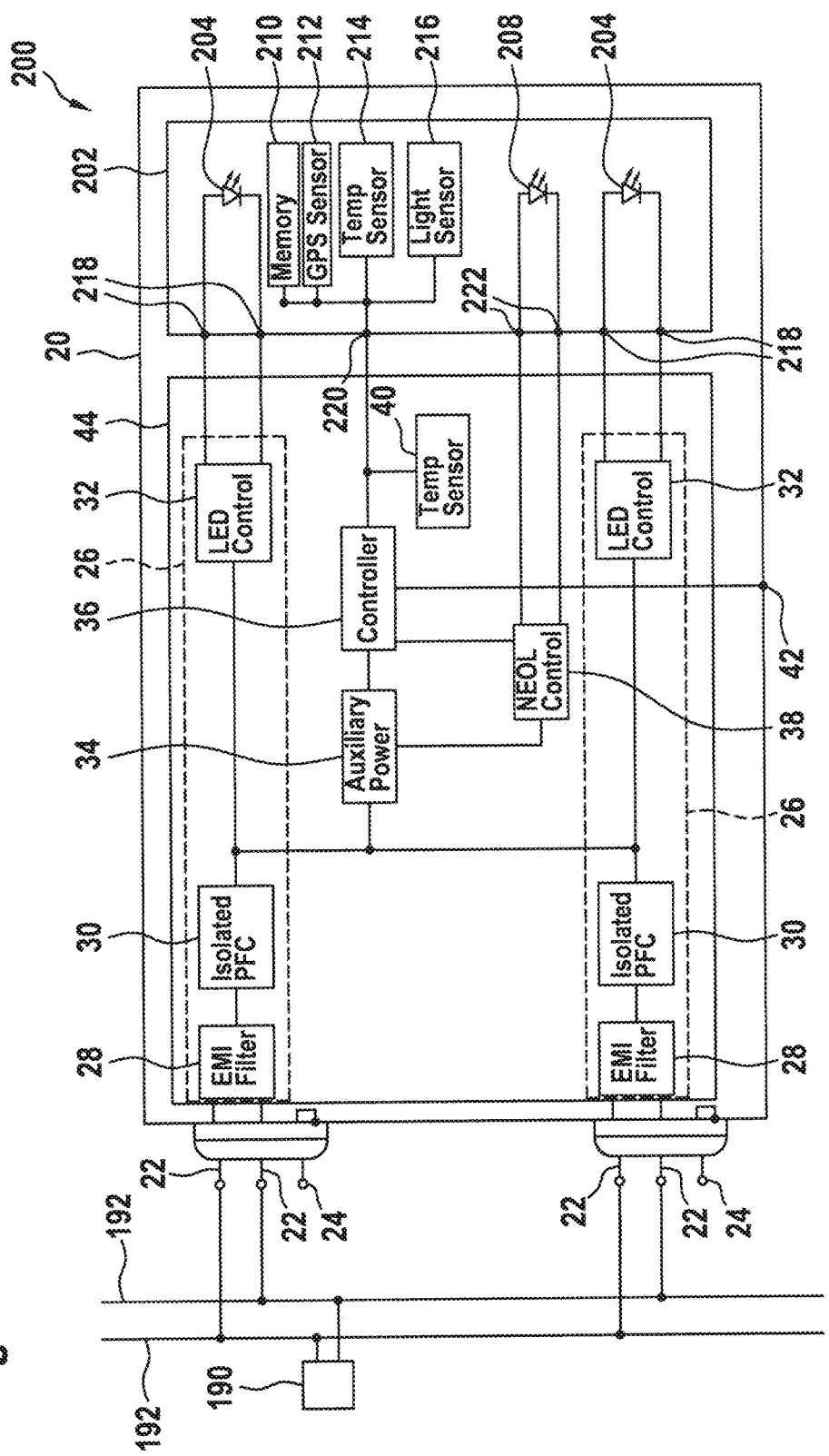
FIG. 4 shows a schematic block diagram of an aircraft navigation light in accordance with an exemplary embodiment of the invention, the aircraft navigation light being equipped with a replaceable light head in accordance with an exemplary embodiment of the invention.

FIG. 4 shows a schematic block diagram of an aircraft navigation light 20 in accordance with an exemplary embodiment of the invention. The aircraft navigation light 20 is equipped with a replaceable light head 200 in accordance with an exemplary embodiment of the invention. The aircraft navigation light 20 may be a standalone aircraft navigation light. It is also possible that the depicted components are part of a combined aircraft navigation and anti-collision light, such as the combined aircraft navigation and anti-collision light 2 of FIG. 3. The depicted components may also be part of another multi-purpose exterior aircraft light.

The aircraft navigation light 20 comprises two power inputs 22, with each of the two power inputs 22 consisting of two AC power input connections in the exemplary embodiment of FIG. 4. The aircraft navigation light 20 further comprises two ground connections 24, which are internally coupled to the housing of the aircraft navigation light 20. The aircraft navigation light 20 further comprises two internal power supplies 26. Each of the internal power supplies 26 comprises an electromagnetic interference filter 28, an isolated power factor correction circuit 30, and an LED control circuit 32. For each of the internal power supplies 26, a respective power input 22 is connected to the electromagnetic interference filter 28, which in turn is connected to the isolated power factor correction circuit 30, which in turn is connected to the LED control circuit 32, which in turn is connectable to the replaceable light head 202, as will be explained below. The internal power supplies 26 may also be referred to as power conditioning circuits, which in operation receive power from the power inputs 22 and supply power to the replaceable light head. It is pointed out that the combination of the electromagnetic interference filter 28, the isolated power factor correction circuit 30, and the LED control circuit 32 is merely an exemplary embodiment of the internal power supply 26. The internal power supply 26 may have any design/circuit structure that allows for the reception of power from the aircraft on-board power supply network and for supply of power to the at least one light source of the replaceable light head 200. The internal power supply 26 may further be adapted to the particular implementation of the aircraft on-board power supply network, e.g. it may be adapted to the aircraft on-board power supply network being an AC power supply network or a DC power supply network. Any expedient AC/DC or DC/DC conversions may be made at any suitable point in the internal power supply 26 via the provision of suitable AC/DC and/or DC/DC converters.

When the aircraft navigation light 20 is installed in an aircraft, the power inputs 22 are coupled to the aircraft on-board power supply network. In FIG. 4, the aircraft on-board power supply network is schematically indicated via a power generator 190 and a pair of power supply lines 192. The aircraft on-board power supply network is a 115 V AC power supply network in the depicted exemplary embodiments. The two power inputs 22 and the two internal power supplies 26 are separate, redundant arrangements, providing power to separate, redundant light sources and thus allowing for the aircraft navigation light 20 to provide the navigation lighting functionality of the aircraft navigation light 20 in a redundant manner.

The aircraft navigation light 20 further comprises an auxiliary power supply 34. The auxiliary power supply 34 is coupled to the internal power supplies 26 for receiving power therefrom. In particular, respective connection points between the isolated power factor correction circuits 30 and the LED control circuits 32 are coupled to the auxiliary power supply 34. This set-up allows for diverting power from the internal power supplies 26 to the auxiliary power supply 34. The auxiliary power supply 34 may instantaneously pass on the diverted power in a suitable manner and/or may have a power storage element, such as a capacitor or a rechargeable battery, for storing power received from the internal power supplies 26.

The aircraft navigation light 20 further comprises a controller 36. The controller 36 is coupled to the auxiliary power supply 34 for receiving power therefrom in operation. The aircraft navigation light 20 further comprises a temperature sensor 40, which is coupled to the controller 36 and which provides temperature data to the controller 36 during operation of the aircraft navigation light 20. Yet further, the aircraft navigation light 20 comprises a near end of life (NEOL) controller 38. The NEOL controller 38 is coupled to the auxiliary power supply 34 for receiving power therefrom and coupled to the controller 36 for communicating therewith. The details of the operation of the controller and the NEOL controller will be described below.

The aircraft navigation light 20 further comprises an external data interface 42. Via the external data interface 42, the aircraft navigation light 20 may communicate with other entities within the exterior aircraft light, in particular in case the aircraft navigation light is a multi-purpose exterior aircraft light, having additional components besides the components providing the aircraft navigation lighting functionality. The external data interface 42 may also be used to communication with other exterior aircraft lights and/or other entities in the aircraft.

In the aircraft navigation light 2 of FIG. 4, the two internal power supplies 26, the auxiliary power supply 34, the controller 36, the NEOL controller 38, and the temperature sensor 40 are arranged on a power and control circuit board 44. The power and control circuit board 44 may be a printed circuit board. The power and control circuit board 44 may provide mechanical support for said components and may provide the electric connections between the components.

As stated above, the aircraft navigation light 20 comprises a replaceable light head 200. The replaceable light head 200 comprises two navigation light sources 204, in particular two navigation LEDs. The two navigation light sources 204 are electrically separate, redundant light sources. Depending on whether the aircraft navigation light 20 is used as a left aircraft navigation light or a right aircraft navigation light or a tail aircraft navigation light, the two navigation light sources 204 may be red or green or white light sources. Each of the two navigation light sources 204 is coupled to a respective power terminal 218 of the replaceable light head 200. In the physical implementation of the aircraft navigation light 20, the two navigation light sources 204 may be arranged right next to each other, for example right next to each other underneath the navigation optical system 206, shown in FIG. 3.

The replaceable light head 200 further comprises a memory 210, a GPS sensor 212, a temperature sensor 214, and a light sensor 216. All of these four components are coupled to a data interface 220 of the replaceable light head 200. The temperature sensor 214 and the light sensor 216 are arranged in such a way that they can measure accurate values or at least accurate proxy values for the operating temperature and the light output of the navigation light sources 204. The GPS sensor is configured to determine a velocity of the replaceable light head and, thus, of the aircraft and to output said velocity data.

The replaceable light head 200 further comprises a near end of life (NEOL) indicator LED 208. The NEOL indicator LED 208 is coupled to a NEOL power supply terminal 222 of the replaceable light head 202. The NEOL indicator LED 208 may for example be a yellow LED.

In the exemplary embodiment of FIG. 4, all of the described components of the replaceable light head 200 are arranged on a circuit board 202. The circuit board 202 may also be referred to as navigation light circuit board 202. The circuit board 202 may in particular be a printed circuit board.

The replaceable light head 200 may be installed in and removed from the aircraft navigation light 20. When installing the replaceable light head 200 in the aircraft navigation light 20, each of the two power terminals 218 is coupled to a respective one of the two internal power supplies 26. Further, the data interface 220 is coupled to the controller 36. Yet further, the NEOL power supply terminal 222 is coupled to the NEOL controller 38. Each of these electric connections is configured for transferring power or data between the replaceable light head 200 and the remainder of aircraft navigation light 20. In addition, when installing the replaceable light head 200 in the aircraft navigation light, the circuit board 202 is mechanically fixed in the aircraft navigation light 20.

Once the replaceable light head 200 is installed in the aircraft navigation light 20, the normal operation of the aircraft navigation light 20 is as follows. Upon power-up of the exterior aircraft light 20 with the replaceable light head 200, the internal power supplies 26 provide power to the navigation light sources 204 via the power terminals 218, such that the exterior aircraft light provides a desired navigation light output. The controller 36 receives power from the auxiliary power supply 34 and communicates with the replaceable light head 202 via the data interface 220.

Once the GPS sensor 212 detects a velocity above a predetermined velocity threshold, such as a velocity above 250 km/h, the GPS sensor issues a trigger signal to the controller 36. Upon receiving the trigger signal, the controller 36 sends usage data of one or both of the internal power supplies 26 to the memory 210.

The usage data may contain operating time of the internal power supply/supplies 26 and/or operating temperature of the internal power supply/supplies 26 or other data that characterizes the usage of the internal power supply/supplies 26. For determining the operating time, the controller 36 may for example count the on-time of the aircraft navigation light 20 after reception of the trigger signal. With respect to the operating temperature, the controller 36 may communicate the temperature sensor data, as output by the temperature sensor 40. The temperature sensor 40 may be arranged adjacent to or may be provided integrated with one or both of the internal power supplies 26, in order to provide a good estimate of the operating temperature of the internal power supply/supplies 26. The memory 210 stores the usage data of the internal power supply/supplies 26, as received from the controller 36 via the data interface 220.

The memory 210 may further store light sensor data, output by the light sensor 216, and/or temperature sensor data, output by the temperature sensor 214. The light sensor data and/or the temperature sensor data may be communicated directly from the light sensor 216/temperature sensor 214 to the memory 210. It is also possible that the light sensor data and/or the temperature sensor data is communicated from the light sensor 216/temperature sensor 214 to the controller 36 and is then communicated back, either in unprocessed or in processed/selective form, to the memory 210.

The usage data of the internal power supply/supplies 26, the light sensor data of the light sensor 216, and the temperature sensor data of the temperature sensor 214 are continuously stored in the memory 210 throughout the operation of the aircraft navigation light 20.

The light sensor data, output by the light sensor 216, and the temperature sensor data, output by the temperature sensor 214, are also communicated to the NEOL controller 38. The NEOL controller 38 may be configured to evaluate the temperature sensor data of the temperature sensor 214 and/or the light sensor data of the light sensor 216 for determining a near end of life condition of the navigation light sources 204. For example, a near end of life condition may be detected, when the light output of the navigation light sources 204 is below a preset light intensity threshold. It is also possible that a near end of life condition is detected in case the replaceable light head 200 is operated above a critical temperature threshold. Also, other criteria may be established for detecting a near end of life condition. In case a near end of life condition is detected, the NEOL controller 38 can provide electric power to the NEOL indicator LED 208. The NEOL indicator LED 208 thus indicates to the environment, such as to ground personnel on an airfield, that a NEOL condition of the replaceable light head 200 is reached.

As a response to such NEOL condition, the replaceable light head 200 is removed from the aircraft navigation light 200 and replaced with a new replaceable light head. The removed replaceable light head 200 is brought to a factory or laboratory for evaluating the data stored in the memory 210. The usage data of the internal power supply/supplies 26, in particular the operating time and the operating temperature of the internal power supply/supplies 26, may be evaluated to determine whether the internal power supply/supplies 26 have reached their end of life/are close to reaching their end of life. In this way, a preemptive maintenance/replacement of the power supply circuitry of the aircraft navigation light, in particular a preemptive maintenance/replacement of the power and control circuit board 44 may be facilitated.

Figure 5:
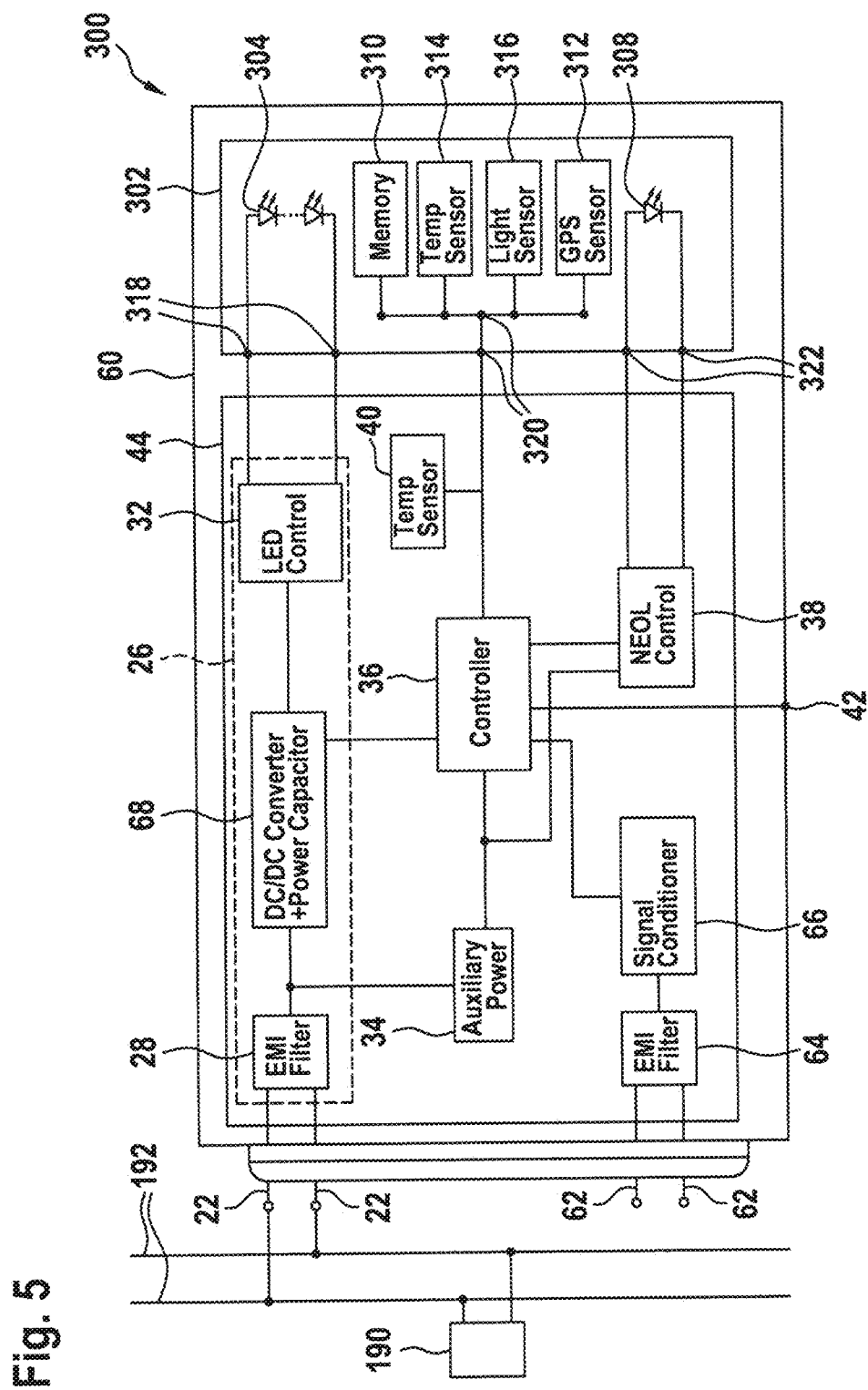
FIG. 5 shows a schematic block diagram of an aircraft anti-collision light in accordance with an exemplary embodiment of the invention, the aircraft anti-collision light being equipped with a replaceable light head in accordance with an exemplary embodiment of the invention.

FIG. 5 shows a schematic block diagram of an aircraft anti-collision light 60 in accordance with an exemplary embodiment of the invention. The aircraft anti-collision light 60 is equipped with a replaceable light head 300 in accordance with an exemplary embodiment of the invention. The aircraft anti-collision light 60 may be a standalone aircraft anti-collision light. It is also possible that the depicted components are part of a combined aircraft navigation and anti-collision light, such as the combined aircraft navigation and anti-collision light 2 of FIG. 3. The depicted components may also be part of another multi-purpose exterior aircraft light.

The aircraft anti-collision light 60 of FIG. 5 is similar to the aircraft navigation light 20 of FIG. 4 in many aspects. Like elements are denoted with the same reference numerals as in FIG. 4, and reference is made to the description of FIG. 4 above. Also, various elements are denoted with reference numerals that are incremented by 100, as compared to FIG. 4. For those elements, ancillary reference is also made to the description of FIG. 4 above. The following description focuses on the differences between the aircraft anti-collision light 60 of FIG. 5 and the aircraft navigation light 20 of FIG. 4.

The aircraft anti-collision light 60 of FIG. 5 has a replaceable light head 300. Similar to the replaceable light head 200 of FIG. 4, the replaceable light head 300 of the aircraft anti-collision light 60 has a memory 310, a GPS sensor 312, a temperature sensor 314, and a light sensor 316. All of these four components are coupled to a data interface 320. Further, similar to the replaceable light head 200 of FIG. 4, the replaceable light head 300 of the aircraft anti-collision light 60 has a NEOL indicator LED 308, which is coupled to a NEOL power supply terminal 322 of the replaceable light head 300.

In the exemplary embodiment of FIG. 5, all of the described components of the replaceable light head 300 are arranged on a circuit board 302. The circuit board 302 may also be referred to as anti-collision light circuit board 302. The circuit board 302 may in particular be a printed circuit board. The replaceable light head 300 may be installed in and removed from the aircraft anti-collision light 60 in a manner analogous to what has been described above with respect to the replaceable light head 200 and the aircraft navigation light 20.

As compared to the replaceable light head 200 of FIG. 4, the replaceable light head 300 of the aircraft anti-collision light 60 of FIG. 5 does not have two separate, redundant light sources for achieving the desired light output. Instead, the replaceable light head 300 has a plurality of serially connected anti-collision light sources 304, which are LEDs in the exemplary embodiment of FIG. 5. The plurality of anti-collision light sources 304 are coupled in series between a power terminal 318. The number of anti-collision light sources 304 may depend on the lighting capacity of the single light sources. There may be fourteen anti-collision light sources 304, as described with respect to FIG. 3, or any other suitable number of anti-collision light sources 304.

As there is only one series connection of anti-collision light sources 304 and as there is only one power terminal 318 for the anti-collision light sources 304 in the replaceable light head 300, the aircraft anti-collision light 60 also has only one internal power supply 26. As described with respect to FIG. 4, the internal power supply 26 is coupled between the aircraft on-board power supply network 192 and the power terminal 318 of the replaceable light head 300. Further, the auxiliary power supply 34 is coupled to the internal power supply 26 for diverting power therefrom.

The internal power supply 26 of the aircraft anti-collision light 60 differs somewhat from the internal powers supply 26 of the aircraft navigation light 20 of FIG. 4. The internal power supply 26 of the aircraft anti-collision light 60 does not have an isolated power factor correction circuit. Instead, the internal power supply 26 of the aircraft anti-collision light 60 has a DC/DC converter and power capacitor circuit 68. It is again pointed out that the combination of the electromagnetic interference filter 28, the DC/DC converter and power capacitor circuit 68, and the LED control circuit 32 is merely an exemplary embodiment of the internal power supply 26. The internal power supply 26 may have any design/circuit structure that allows for the reception of power from the aircraft on-board power supply network and for supply of power to the plurality of anti-collision light sources 304 of the replaceable light head 300. The internal power supply 26 may further be adapted to the particular implementation of the aircraft on-board power supply network, e.g. it may be adapted to the aircraft on-board power supply network being an AC power supply network or a DC power supply network. Any expedient AC/DC or DC/DC conversions may be made at any suitable point in the internal power supply 26 via the provision of suitable AC/DC and/or DC/DC converters. In the exemplary embodiment of FIG. 5, an AC/DC conversion may be carried out in the electromagnetic interference filter 28 or in the DC/DC converter and power capacitor circuit 68 or at some point therebetween.

The aircraft anti-collision light 60 is configured to output a white strobe anti-collision light output. In particular, the aircraft anti-collision light 60 is configured to output a sequence of white light flashes in operation. For this purpose, the plurality of anti-collision light sources 304 are white LEDs. Further, the controller 36 is configured to control the LED control 32 to provide current pulses to the plurality of anti-collision light sources 304.

The aircraft anti-collision light 60 further comprises a synchronization terminal 62, through which synchronization commands for the pulses of the white strobe anti-collision light output are received. The synchronization terminal is coupled to the controller 36 via an electromagnetic interference filter 64 and a signal conditioner 66. On the basis of the received synchronization information, the controller 36 times the sequence of white light flashes.

With respect to the generation of usage data at the controller 36, the acquisition of temperature sensor data via the temperature sensor 314, the acquisition of light sensor data via the light sensor 316, the issuing of the trigger signal by the GPS sensor 312, and the storing of data in the memory 310, reference is made to the description of FIG. 4 above.

When the aircraft navigation light components of FIG. 4 and the aircraft anti-collision light components of FIG. 5 are used in the same exterior aircraft light or in adjacently positioned exterior aircraft lights, the external data interfaces 42 may be used to exchange data between the two systems. In particular, data stored in the memories 210, 310 of the respective replaceable light heads 200, 300 may be copied and transferred to the respectively other light head. In this way, data may be mirrored and a safeguard against loss of data may be established.

Figure 6:
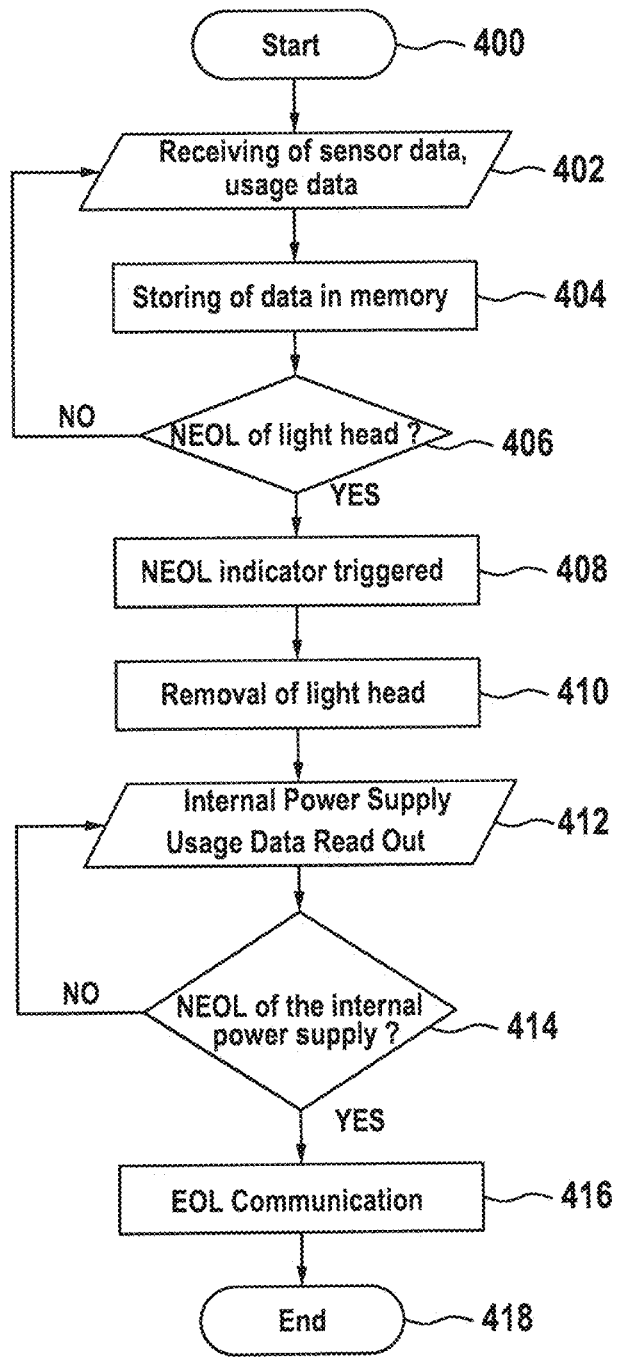
FIG. 6 illustrates a method of evaluating an operating status of an internal power supply of an exterior aircraft light in accordance with an exemplary embodiment of the invention in a flow diagram.

FIG. 6 illustrates a method of evaluating an operating status of an internal power supply of an exterior aircraft light in accordance with an exemplary embodiment of the invention by means of a flow diagram.

At step 400, the method starts. The method may in particular start after the issuance of a trigger signal from the GPS sensor. The trigger signal may indicate a take-off of the aircraft. Further in particular, the trigger signal may indicate the first flight of the replaceable light head of the exterior aircraft light and may indicate that the service life of the replaceable light head starts.

After the start of the method, usage data and sensor data is continuously generated and received at the memory of the replaceable light head, as indicated by step 402. Step 404 indicates that the received data is continuously stored in the memory, located in the replaceable light head. The received and stored data may comprise usage data of the internal power supply of the exterior aircraft light and temperature sensor data of the temperature sensor in the replaceable light head and light sensor data of the light sensor in the replaceable light head.

At step 406, it is evaluated if a near end of life (NEOL) condition of the replaceable light head is present. If not, the generation and storing of data continues. If a NEOL condition is detected, the NEOL indicator LED is lit up, in order to communicate the NEOL condition, as indicated at step 408.

At step 410, the replaceable light head is removed from the exterior aircraft light and is transported to a factory or laboratory setting.

At step 412, the usage data of the internal power supply, potentially in combination with the sensor data of the light sensor and/or the temperature sensor of the replaceable light head, is read out of the memory of the replaceable light head. On the basis of the data, an operating status of the internal power supply of the exterior aircraft light is evaluated. For example, on the basis of the usage data of the internal power supply, potentially in combination with usage data prior to the installation of the replaceable light head in question, a remaining life of the power supply may be calculated.

It is possible that the method ends here and that the evaluation of the operating status of the internal power supply is available to maintenance personnel, pilots, air traffic safety personnel, or other involved persons. However, it is also possible that a binary decision on whether or not the internal power supply has reached its end of life is made at step 414.

If the internal power supply has not reached its end of life, steps 412 and 414 may be re-visited, when the next replaceable light head is removed from the exterior aircraft light and its data is evaluated. If it is determined that the internal power supply has reached its end of life, said determination is communicated to a suitable authority, such as maintenance personnel, at step 416. This may then lead to the exchange of one or more components of the exterior aircraft light or even to the exchange of the entire exterior aircraft light. The method then ends at step 418.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An exterior aircraft light, comprising:
   a power input, coupleable to an aircraft on-board power supply network;
   an internal power supply, coupled to the power input;
   a controller; and a replaceable light head comprising:
 a mounting structure for attaching the replaceable light head to the exterior aircraft light;
 a power terminal, coupled to the internal power supply of the exterior aircraft light;
 at least one light source, coupled to the power terminal for receiving power from the internal power supply of the exterior aircraft light;
 a data interface, coupled to the controller of the exterior aircraft light; and
 a memory, coupled to the data interface and configured to receive and store usage data of the internal power supply of the exterior aircraft light, wherein the usage data of the internal power supply of the exterior aircraft light comprises operating time of the internal power supply and operating temperature of the internal power supply.

2. An air plane, comprising:
 at least one exterior aircraft light in accordance with claim 1.

3. A method of evaluating an operating status of an internal power supply of an exterior aircraft comprising:
 during operation of the exterior aircraft light, storing usage data of the internal power supply of the exterior aircraft light in a memory of a replaceable light head of the exterior aircraft light, wherein the usage data of the internal power supply of the exterior aircraft light comprises operating time of the internal power supply and operating temperature of the internal power supply;
 removing the replaceable light head from the exterior aircraft light; and
 reading the usage data out of the memory and evaluating the operating status of the internal power supply of the exterior aircraft light from the usage data.

4. A method according to claim 3, further comprising:
 detecting an aircraft take-off; and
 starting the storing of usage data of the internal power supply of the exterior aircraft light in response to an aircraft take-off being detected.

5. The exterior aircraft light according to claim 1, wherein the replaceable light head further comprises a light sensor arranged to monitor the at least one light source, wherein the light sensor is coupled to the memory and wherein the memory is configured to store light sensor data, output by the light sensor.

6. The exterior aircraft light according to claim 1, wherein the replaceable light head further comprises a temperature sensor arranged to monitor an operating temperature of the replaceable light head, wherein the temperature sensor is coupled to the memory and wherein the memory is configured to store temperature sensor data, output by the temperature sensor.

7. The exterior aircraft light according to claim 1, wherein the replaceable light head further comprises at least one of a position sensor, a velocity sensor, and an acceleration sensor, configured to issue a trigger signal, indicative of an aircraft take-off, to the memory.

8. The exterior aircraft light according to claim 7, wherein the memory is configured to store usage data of the internal power supply after receipt of the trigger signal.

9. The exterior aircraft light according to claim 1, wherein the memory is configured to store erosion data indicative of a state of erosion of a lens cover of the exterior aircraft light.

10. The exterior aircraft light according to claim 1, wherein the exterior aircraft light is a multi-function exterior aircraft light having the replaceable light head and at least one additional light head and wherein the memory of the replaceable light head is configured to store data copied from the at least one additional light head.

11. The exterior aircraft light according to claim 1, wherein the mounting structure comprises a circuit board, in particular a printed circuit board, with the at least one light source and the memory being mounted to the circuit board.

12. The exterior aircraft light according to claim 1, wherein the replaceable light head further comprises an optical system arranged over the at least one light source and mounted to the mounting structure, with the at least one light source and the optical system jointly providing a light output of the exterior aircraft light.

13. The exterior aircraft light according to claim 1, wherein the replaceable light head is configured to provide at least one of a navigation light output, a white strobe anti-collision light output, and a red flashing beacon light output.

* * * * *